United States Patent [19]
Dombrowski et al.

[11] Patent Number: 5,440,660
[45] Date of Patent: Aug. 8, 1995

[54] FIBER OPTIC MICROCABLE PRODUCED WITH FIBER REINFORCED ULTRAVIOLET LIGHT CURED RESIN AND METHOD FOR MANUFACTURING SAME

[75] Inventors: James H. Dombrowski, Carlsbad; Steven J. Cowen; William A. Kerr, III, both of San Diego, all of Calif.

[73] Assignee: The United States of America as represented by the Secretary of Navy, Washington, D.C.

[21] Appl. No.: 255,129

[22] Filed: Jun. 7, 1994

Related U.S. Application Data

[63] Continuation of Ser. No. 60,618, May 10, 1993, abandoned, which is a continuation-in-part of Ser. No. 197,491, May 23, 1988, Pat. No. 5,259,055.

[51] Int. Cl.⁶ ............................ G02B 6/00; G02B 6/44
[52] U.S. Cl. ................................. 385/102; 385/100; 385/107
[58] Field of Search ............... 385/102, 100, 107, 126, 385/128

[56] References Cited

U.S. PATENT DOCUMENTS

| | | | |
|---|---|---|---|
| 4,629,286 | 12/1986 | Fuse et al. ........................... | 385/128 |
| 4,812,489 | 3/1989 | Watanabe et al. ............... | 385/126 X |
| 5,259,055 | 11/1993 | Cowen et al. .................. | 385/107 X |

OTHER PUBLICATIONS

U.S. patent application Ser. No. 07/199,820, filed 26 May 1988 titled "Process For Fabricating Fiber Optic Microcable Using Radiation Cured Composite", by Steven J. Cowen et al (still pending).

U.S. patent application Ser. No. 07/197,491, filed 23 May 1988 titled "Fiber Optic Microcable Produced With Radiation Cured Composite", by Steven J. Cowen et al now U.S. Pat. No. 5,259,055.

U.S. patent application Ser. No. 07/573,946, filed 28 Aug. 1990 titled "Fiber Optic Microcable Produced With Radiation Cured Composite", by Steven J. Cowen et al (still pending).

*Primary Examiner*—Frank Gonzalez
*Assistant Examiner*—Phan T. H. Palmer
*Attorney, Agent, or Firm*—Harvey Fendelman; Thomas Glenn Keough; Michael A. Kagan

[57] ABSTRACT

The invention provides a fiber reinforced optical microcable comprised of a buffered optical waveguide coated with a fiber reinforced protective sheath made of a fiber reinforced, ultraviolet light cured resin over which is formed an ultraviolet light cured resin overcoat. The protective sheath is manufactured by soaking reinforcing fibers in the UV curable resin, placing the wetted fibers around the buffered optical waveguide, feeding both the fibers and buffered optical waveguide through a die, and curing the resin with ultraviolet light. Then, an ultraviolet light cured resin is flow coated over the protective sheath and cured with ultraviolet light to complete the microcable.

10 Claims, 5 Drawing Sheets

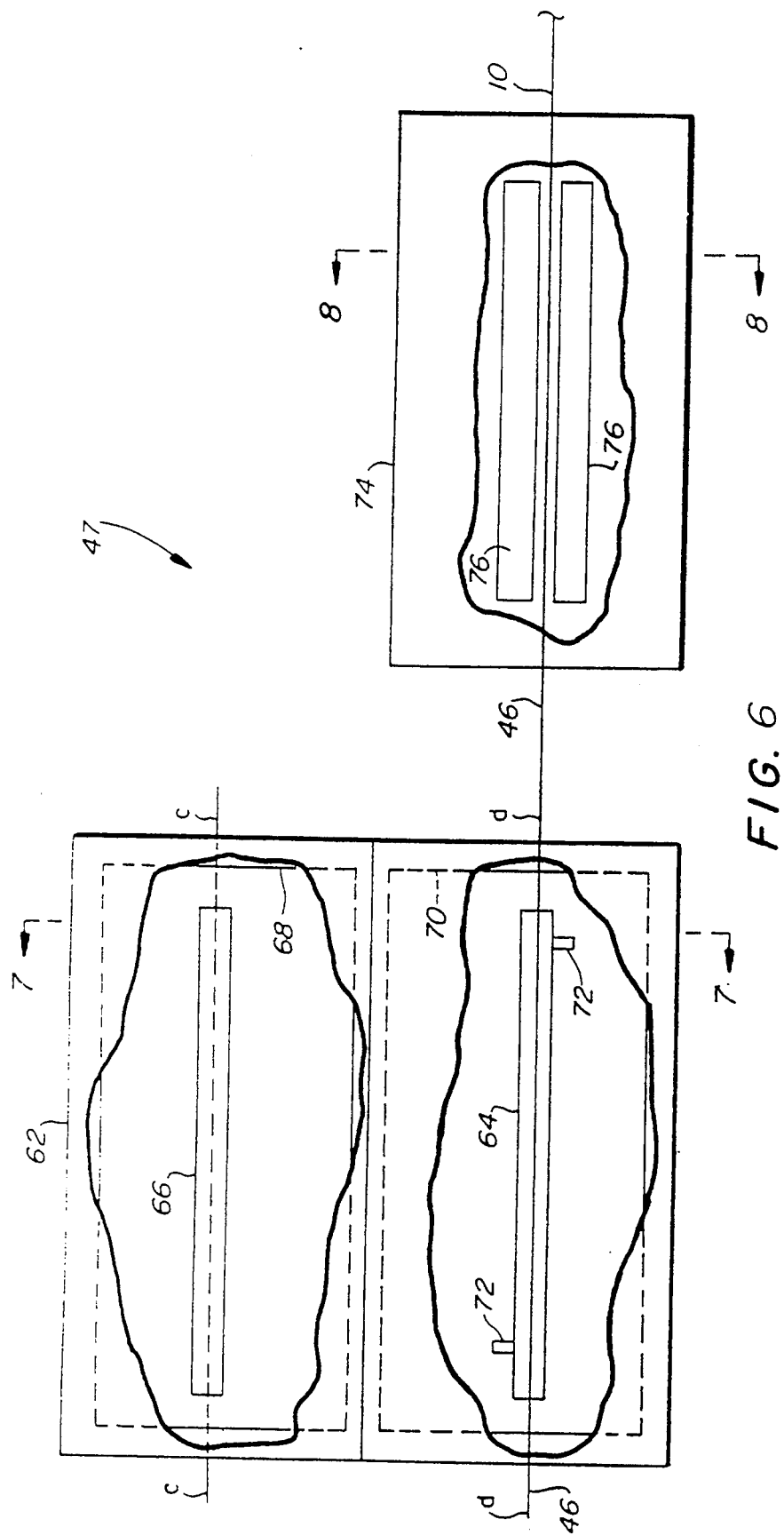

FIBER OPTIC MICROCABLE PRODUCED WITH FIBER REINFORCED ULTRAVIOLET LIGHT CURED RESIN AND METHOD FOR MANUFACTURING SAME

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This application is a continuation of application Ser. No. 08/060,618, filed May 10, 1993 now abandonment, which is a continuation-in-part of application Ser. No. 197,491, filed May 23, 1988, now U.S. Pat. No. 5,259,055.

BACKGROUND OF THE INVENTION

The present invention generally relates to the field of fiber optic communications and more particularly to fiber optic cables. Specifically, the present invention provides a fiber optic microcable having a uniform cross-sectional area and a continuous length greater than conventional microcables.

A fiber optic microcable is basically comprised of a glass or plastic fiber core, a buffer, and a protective sheath. The protective sheath is typically composed of a heat polymerized organic resin impregnated with reinforcing fibers. Conventional resin materials are typically polymerized or cured at temperatures which may exceed 200° C. These temperatures can damage the ultraviolet light cured buffer layers present on state-of-the-art optical fibers resulting in unacceptable degradation of optical performance. One alternative is to use heat resistant buffer layers composed of silicone rubber or thermoplastic. However, these materials greatly increase the costs of the microcable. An alternative to using expensive buffer materials is to increase the exposure time of the resin to a more moderate curing temperature for a longer period of time as compared to curing the resin at higher temperatures. This solution disadvantageously requires either a very long production oven which may be 100 to 200 feet long or a microcable production rate limited to approximately four inches per second. Both of these methods increase the microcable production costs.

A further problem associated with heat curable polymeric sheathing materials is that the sheathing tends to deform while curing, causing the microcable to become out of round. This results in a microcable having a nonuniform, noncircular cross section which creates difficulties when precision winding the microcable onto spools. Still another problem with heat curable polymeric resins is limited pot life which sets an upper limit on the continuous length of fiber optic microcable which can be fabricated in a given production run. Physical properties of heat curable resins tend to vary throughout their pot lives thereby creating additional manufacturing difficulties. All of these problems combine to increase the costs of fiber optic microcable applications and limit the maximum obtainable continuous lengths of microcable to at most 10 kilometers.

Therefore, there is a continuing need to develop a fiber optic microcable which can be more readily manufactured to greater lengths than are obtainable with fiber optic cables made with heat curable resins and within acceptable tolerances and costs.

SUMMARY OF THE INVENTION

The present invention provides a fiber optic microcable that overcomes the dimensional uniformity problems, length limitations and cost disadvantages inherent in the prior art. The fiber optic microcable includes an optical fiber core surrounded by a buffer, fiber reinforced protective sheath, and an overcoat. The protective sheath consists of an ultraviolet light curable first resin impregnated with fibers to enhance the physical strength characteristics of the microcable. The overcoat is made of an ultraviolet light curable second resin which improves the handling characteristics of the microcable by providing a smooth outer surface over the protective sheath. The overcoat provides the microcable with advantages of improved roundness, prevention of the reinforcing fibers in the first resin from damaging the equipment used to deploy or spool the microcable, elimination of exposed fibers from protruding from the first resin, minimization of nicking or cutting of the reinforcing fibers which could create stress concentration points that result in buckling of the microcable, and improvement in the capability of the overcoat and protective sheath to be stripped from the microcable for termination purposes.

The first and second resins polymerize almost instantaneously upon exposure to ultraviolet light. This permits the microcable to be manufactured at rates greater than 1 meter per second by processing it through an ultraviolet light processor. The processing rate of the microcable is determined by the cure rate of the resins, the length of the ultraviolet lamp(s), and the intensity of the ultraviolet light falling incident upon the resins. Because curing takes place almost immediately, there is no tendency for the resin to sag out of round as there is for microcable cured in a long oven. Therefore, the resulting microcable is uniformly round over its entire length. Another significant advantage with microcables manufactured with ultraviolet light curable resins is that the resin temperatures attained during polymerization are less than 100° C. as opposed to temperatures greater than 200° C. for heat curable resins. The lower temperatures enable the microcables to be fabricated with standard state-of-the-art telecommunications optical fiber using ultraviolet light cured buffers which are relatively inexpensive.

One advantage of the present invention is to provide a fiber optic microcable having a substantially uniformly round cross section over the length of the microcable. Another advantage of the present invention is to provide a microcable that can be fabricated in lengths that greatly exceed 10 kilometers. A very important advantage of the present invention is to provide a fiber optic microcable which can be cured at less than 100° C. by incorporating resins that are cured upon exposure to ultraviolet light. This latter advantage is important because it enables fiber optic microcables to be fabricated with optical waveguide buffers that would otherwise be damaged at the temperatures required to polymerize heat cured resins.

Furthermore, the present invention provides a fiber optic microcable which can be manufactured at rates which exceed 1 meter per second. A still further advantage of the present invention is that it provides a fiber optic microcable with an overcoat which is cured upon exposure to ultraviolet light at temperatures below those required to polymerize heat cured resins. The overcoat provides the microcable with advantages of improved roundness, prevention of the reinforcing fibers in the first resin from damaging the equipment used to deploy or spool the microcable, elimination of exposed fibers from protruding from the first resin, minimization of nicking or cutting of the reinforcing fibers which could create stress concentration points that result in buckling of the microcable, and improvement in the capability of the overcoat and protective sheath to be stripped from the microcable for termination purposes.

Other advantages of the invention will become apparent from the following detailed description of the invention when considered in conjunction with the accompanying drawings.

BRIEF DESCRIPTION OF THE DRAWINGS

FIG. 6 is a plan view of a two-stage ultraviolet light curing station.

DESCRIPTION OF THE PREFERRED EMBODIMENT

Figure 1:
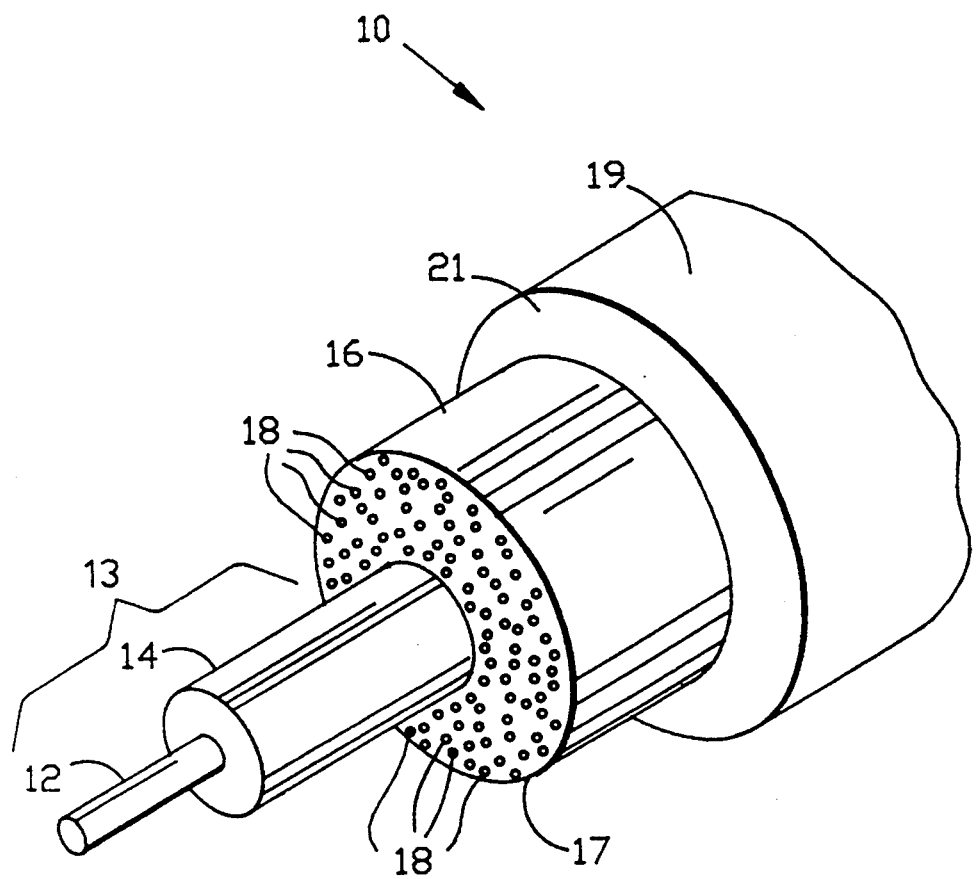
FIG. 1 is a breakaway view of a fiber optic microcable embodying various features of the present invention.

Referring now to FIG. 1 wherein like reference numerals designate like or similar parts throughout the several views, there is illustrated a fiber optic microcable 10 embodying various features of the present invention. The microcable 10 includes an optical waveguide 13 comprising an optical fiber core 12 surrounded by a buffer 14, a protective sheath 16 composed of an ultraviolet light cured polymeric resin 17 impregnated with reinforcing fibers 18, and an overcoat 19 composed of an ultraviolet light cured polymeric resin 21.

By way of example, fiber core 12 may be Corning single mode dispersion shifted optical fiber, and buffer 14 may be a Corning CPC 3 buffer. Desirable buffer characteristics include acceptable microbending isolation over a wide range of temperatures, high dimensional uniformity, good adhesion to the ultraviolet light cured first resin, and low cost. Reference to the optical fiber core 12 implicitly includes reference to cladding (not shown) and the substrate (not shown) surrounding the core. It is to be understood that hereinafter, unless otherwise stated, all references to the core 12 also refer to the cladding and substrate. Fibers 18, which may be fiberglass filaments grouped as yarns or rovings, enhance the resistance of the microcable 10 to physical damage which may result from tensile or bending forces to which the microcable may become subjected. Although the fibers 18 have been described as being composed of fiberglass, it is to be understood that it is within the scope of this invention for the fibers to be composed of other materials, as for example, boron, nylon, carbon graphite, ceramic, or aromatic polyamide polymers such as "KEVLAR," a product of the Dupont Chemical Corporation, and which may be grouped as yarns, rovings or single filaments. By way of example, fibers 18 may be Owens-Corning fiberglass ECG150-1/0-.7Z with a 603-0 finish. The fibers 18 are preferably suspended in the resin 17 generally parallel to optical fiber core 12. The reinforcing fibers may constitute 50 to 90 percent by volume of the fiber/resin composite mixture which defines the protective sheath 16.

An important advantage of the microcable 10 is that it may be manufactured to have a generally uniformly concentric cross-sectional area attributable to rapid cure of the ultraviolet light curable resin 17. Although fibers 18 have been described as running parallel to optical fiber core 12, it is within the scope of the invention for fibers 18 to be suspended in other patterns in the resin, as for example, a helical or woven pattern around optical fiber core 12.

Figure 3:
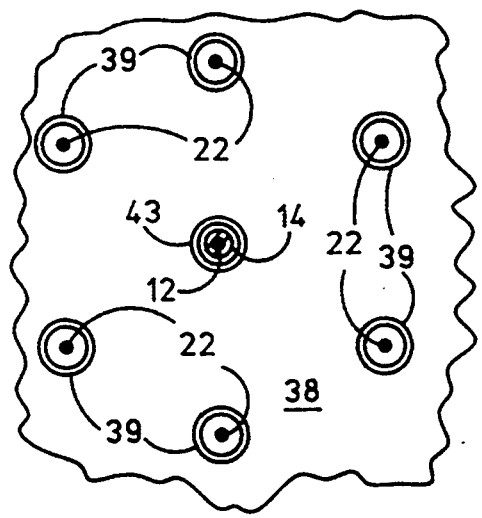
FIG. 3 is a view of the comb plate along line 3—3 of FIG. 2.
Figure 2:
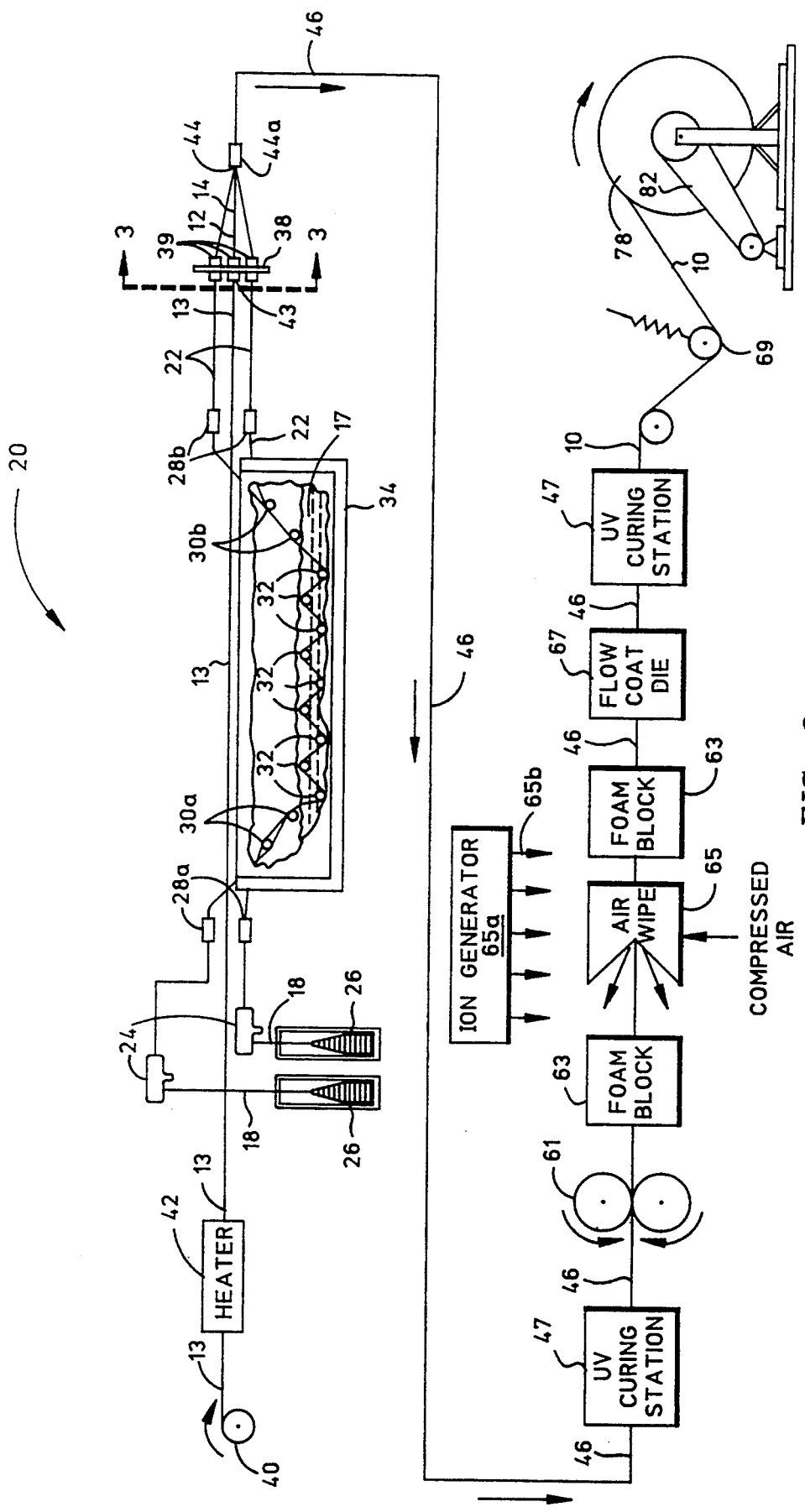
FIG. 2 is a schematic diagram of a system for manufacturing the fiber optic microcable of FIG. 1.

Referring to FIG. 2, there is shown a system 20 for manufacturing the microcable 10 which includes fibers 18, preferably composed of fiberglass, dispensed from storage bobbins 26. The fibers 18 are subjected to back tension, which may be 0.1 Newtons, and which may be controlled by textile tensioners 24. The fibers 18 are individually drawn through ceramic guides 28a and then over a first set of guide pins 30a. The fibers proceed through a staggered series of ceramic pins 32 in a temperature controlled wetting pan 34 containing uncured ultraviolet light curable resin 17. The uncured resin 17 is maintained at a temperature preferably in the range from 27°–70° C. to facilitate wetting the fibers 18. Any air which may become entrapped in the resin 17 which wets the fibers 18 is released as the wetted fibers pass over and under ceramic pins 32. Referring to FIGS. 2 and 3, the wetted fibers 18 are drawn over a second set of guide pins 30b, exit wetting pan 34 and then individually pass through ceramic guides 28b. The wetted fibers proceed through ceramic guides 39 mounted in comb plate 38 so that fibers 18 are preferably radially distributed around the optical waveguide 13. The optical waveguide 13 is fed from a spool 40 through a heater 42 preferably maintained at a temperature of about 250° F. which is used to drive residual moisture from the optical fiber buffer. The optical waveguide 13 is fed through the heater 42 at a speed such that the optical waveguide is exposed to the heater for a time period preferably in the range of about 1–2 seconds. The optical waveguide 13 then continues on through ceramic guide 43 mounted in comb plate 38. FIG. 2 is presented by way of example only. Within the scope of the invention, fewer or greater numbers of fibers 18 may be utilized than are actually shown.

After exiting comb plate 38, fibers 18 and optical fiber core 12 with accompanying buffer 14 converge as they pass through a circular aperture 44 of a heated tungsten-carbide forming die 44a to form a matrix 46 as shown in FIG. 2. The diameter of aperture 44 determines the diameter and fiber/resin ratio of microcable 10.

Numerical reference 47 represents alternative species of methods for curing matrix 46. The first species is encompassed within lamp housing 48 illustrated in FIGS. 4 and 5. The second species is encompassed within lamp housings 62 and 74 illustrated in FIGS. 6, 7 and 8.

Figure 5:
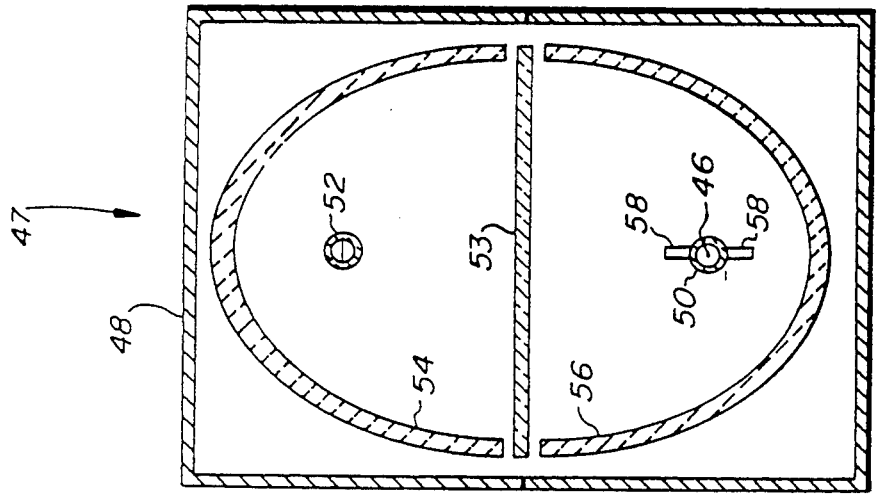
FIG. 5 is a cross-sectional end view of the ultraviolet light curing station along line 5—5 of FIG. 4.
Figure 4:
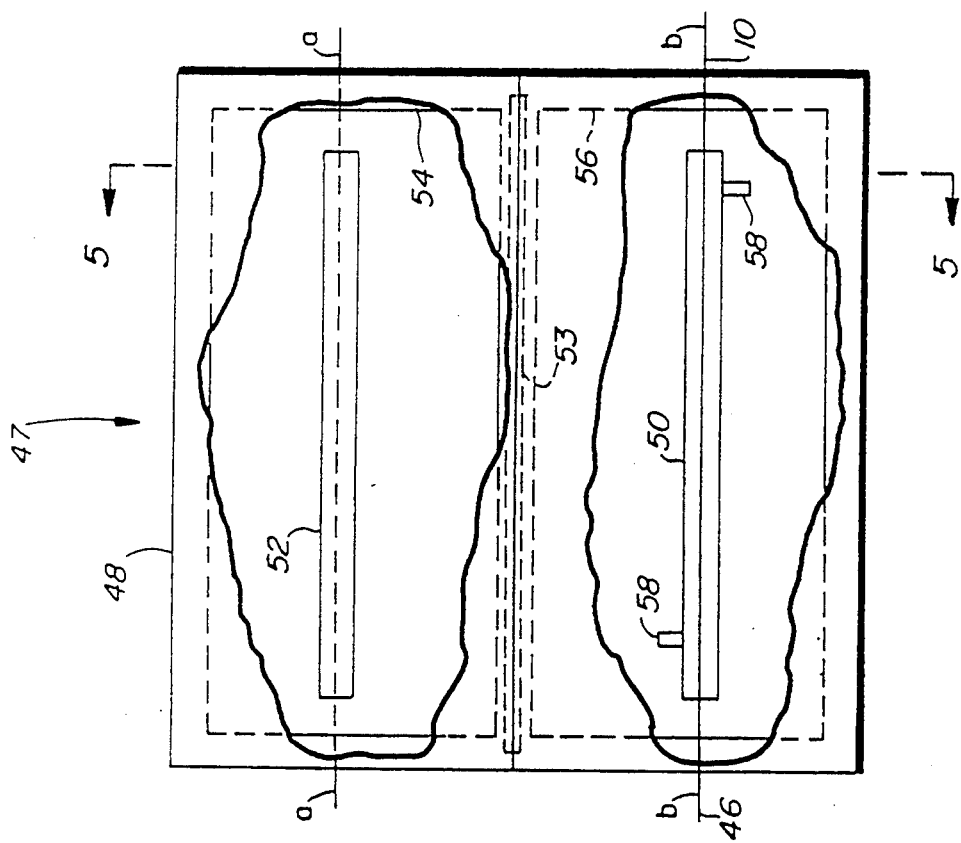
FIG. 4 is a plan view of a single stage ultraviolet light curing station of FIG. 2.

A single-stage method for curing matrix 46 is illustrated in FIGS. 4 and 5 wherein after exiting aperture 44 shown in FIG. 2, the matrix 46 enters a lamp housing 48. The matrix passes through a quartz tube 50 within the lamp housing in approximately 0.5 seconds through which it is irradiated at an intensity of approximately 100,000 microwatts/cm$^2$ by a single-stage electromagnetic radiation source 52 emitting ultraviolet light at a wavelength of anywhere from 290 to 400 nanometers. Quartz tube 50 shields matrix 46 from infrared radiation generated by electromagnetic radiation source 52 while being transparent to ultraviolet radiation. Quartz tube 50 may advantageously be filled with an inert gas such as nitrogen or helium so that matrix 46 is immersed within an inert gas atmosphere to improve cooling of the matrix 26 as the resin 17 cures and to prevent undesirable chemical reactions from occurring between atmospheric oxygen and the resin 17. A quartz plate 53, which may be 0.32 cm thick, may be mounted between electromagnetic radiation source 52 and quartz tube 50 to further shield matrix 46 from infrared radiation. The longitudinal axis of electromagnetic radiation source 52 is generally coincident with a focal axis a—a of a semi-elliptically shaped mirror 54. The longitudinal axis of quartz tube 50 is generally coincident with a focal axis b—b of a semi-elliptically shaped mirror 56. The reflective concave surface of mirror 54 faces the reflective concave surface of mirror 56 so that the reflective surfaces of both mirrors define an elliptical mirror having focal axes a—a and b—b.

Ultraviolet light from electromagnetic radiation source 52 both propagates directly towards matrix 46 and reflects off of mirror 54 to mirror 56, and then converges on focal axis b—b so that matrix 46 is irradiated from a 360° field. Dry nitrogen injected into quartz tube 50 through nipples 58 displaces oxygen which can inhibit polymerization of the resin 17 and cools the matrix while it cures. The resin 17 cures almost instantaneously upon exposure to the ultraviolet light, causing the resin to adhere to the optical buffer 14. Of course, matrix 46 may be conveyed through two or more lamp housings 48 arranged in series in order to increase the ultraviolet light exposure of matrix 46 as a way of increasing the production rate of the fabrication system, providing the temperature of the matrix 46 does not reach a level that would degrade any of the materials that comprise matrix 46.

Figure 7:
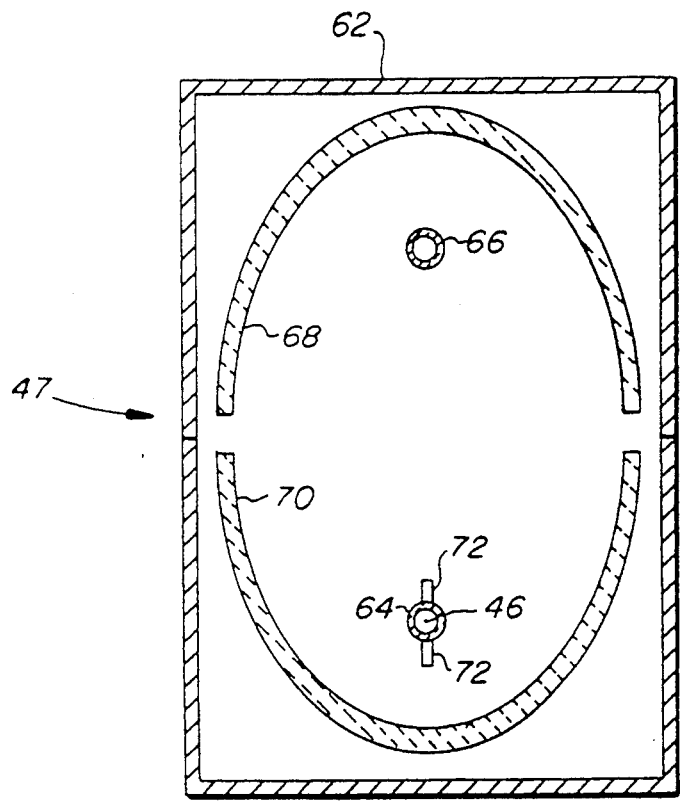
FIG. 7 is a cross-sectional end view of the medium intensity ultraviolet light curing station along line 7—7 of FIG. 6.
Figure 8:
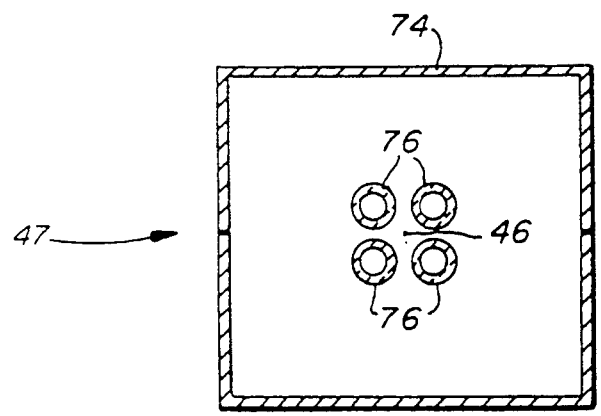
FIG. 8 is a cross-sectional view of the low intensity ultraviolet light curing station along line 8—8 of FIG. 6.

An alternative to the single-stage method for curing the resin 17, as described above, is a two-stage curing method illustrated in FIGS. 6, 7, and 8, collectively, wherein after exiting aperture 44 shown in FIG. 2, matrix 46 enters lamp housing 62. Within the lamp housing, the matrix 46 passes through a quartz tube 64 through which it is irradiated at a medium intensity of 5000 to 10,000 microwatts/cm$^2$ by an electromagnetic radiation source 66 emitting ultraviolet light at a wavelength of approximately 290 nanometers. The ultraviolet light polymerizes the outer regions of the resin 17. Because the outer surface of the resin 17 is cured, the curing matrix 46 does not sag out of round during subsequent curing. Quartz tube 64 shields matrix 46 from infrared heat generated by electromagnetic radiation source 66 while being transparent to ultraviolet radiation. The longitudinal axis of electromagnetic radiation source 66 is generally coincident with a focal axis c—c of a semi-elliptically shaped mirror 68. The longitudinal axis of quartz tube 64 is generally coincident with a focal-axis d—d of a semi-elliptically shaped mirror 70. The reflective concave surface reflective concave surface of mirror 68 faces the reflective concave surface of mirror 70 so that the reflective surfaces of both mirror define an elliptical mirror having focal axis c—c and d—d.

Ultraviolet light from electromagnetic radiation source 66 propagates directly towards matrix 46 and reflects off of mirror 68 to mirror 70, and then converges on focal axis d—d so that matrix 46 is irradiated from a 360° field. Dry nitrogen injected into quartz tube 64 through nipples 72 displaces oxygen which can inhibit polymerization of the outer regions of the resin 17 and also serves to cool the matrix 46.

Referring to FIGS. 6, 7, and 8, after exiting lamp housing 62, the matrix 46 enters lamp housing 74 where the partially cured resin 17 passes between four low intensity ultraviolet lamps 76 which irradiate matrix 46 with ultraviolet light having a wavelength of about 360 nanometers at a relatively low intensity of approximately 2,000 microwatts/cm$^2$. The longer ultraviolet light wavelength is able to penetrate more deeply into the curing resin of the matrix 46 than does shorter wavelength ultraviolet light. This second curing stage completes polymerization of resin 17. The purpose of the two-stage curing process is to limit the overall temperature rise of the matrix 46 to no more than 100° C.

Although the microcable 10 has been described as having one layer of the protective sheath 16, it is to be understood that the microcable 10 may have one or more layers of protective sheathing as required to suit the requirements of a particular application.

Referring now to FIG. 2, after the resin 17 is cured, the matrix 46 enters a traction or capstan drive 61 which feeds the matrix 46 through the various manufacturing processing stages in the manufacture of the microcable. The matrix 46 then enters a foam block 63 that preferably includes a section of open cell polyurethane foam that provides a wiping surface which tends to break away any stray fibers 18 that protrude from the surface of the protective sheath 16. After exiting the foam block 63, the matrix 46 is fed through an air wipe 65 that directs pressurized air over the surface of matrix 46 to blow off any broken reinforcing fibers 18 or dust particles from the surface of the protective sheath 16 of the matrix. The matrix 46 then enters a second open cell foam block 63 used to dampen vibration or strumming of the of matrix 46 generated by the air wipe 65. An alternative to the second open cell foam block 63 may be a nipple or guide eyelet, not shown, through which the matrix passes, having a diameter slightly greater than the matrix 46 so as to eliminate vibration of the matrix 46. The matrix 46 next is directed through a pressurized flow coating head 67 where the ultraviolet light curable resin 21 which forms the overcoat 19 is applied around the protective sheath 16 of the matrix 46. The wall thickness of the overcoat 19 is preferably in the range of about 0.0007 to 0.0015 inches. The exit diameter of the pressurized flow coating head 67 determines the final outside diameter of the microcable 10. By way of example, the flow coating head 67 may implemented as a fiber optic flow coating system manufactured by Sancliff, Inc., Worchester, Mass. The matrix 46 then enters a second ultraviolet light curing station 47 in which polymerization of the resin 21 transforms a section of the matrix 46 into a completed section of microcable 10 having an unfilled overcoat 19, as shown in FIG. 1. Optionally, after the resin 17 has been cured, the surface of the protective sheath 16 may be washed with ions 65b provided by an ion generator 65a to prevent the build-up of static electricity on the matrix 46 and to maintain the cleanliness of the protective sheath 16 before the overcoat 19 is applied.

Referring to FIG. 2, the cured microcable 10 is preferably under constant tension established by a tension control dancer arm 69, set at a tension which may range from about 5 to 10 pounds. The microcable 10 is taken up, or spooled onto a storage spool 78 driven by means well known by those skilled in the art, as for example, by an electric motor 80 coupled to the spool 78 by a "V"-belt 82. The fiber optic microcable 10 may then be stress relieved by soaking the cooled fiber optic microcable in an atmosphere having a temperature of approximately 70° C. for about four hours, and then allowing the microcable to air cool. The microcable 10 may also be stress relieved by allowing the microcable to soak at room temperature for a few days.

The resin 17 preferably has a Young's Modulus ranging from approximately 700,000 to 2,500,000 kPa after cure, a post-cure tensile strength of approximately 28,000 to 56,000 kPa, an uncured viscosity of less than 250 centipoise within the range of 27° C. to 60° C., moisture absorption of less than one percent in 24 hours of water immersion after cure, strain to failure of $1\frac{1}{2}$ after cure, and a glass transition temperature from 60° C. to 105° C. after cure. Furthermore, resin 17 polymerizes or cures when exposed to electromagnetic radiation having a wavelength anywhere from 290 to 400 nanometers. By way of example, good results have been obtained using ultraviolet light curable resins such as DeSoto, Inc. No. 3287-5-9, Master Bond, Inc. No. 17D-1A, and Borden 9MKU11127R for use in the protective sheath 16, although the scope of the invention also includes the use of other suitable resins.

The ultraviolet light curable resin 21 provides the microcable 10 with a smooth unfilled overcoat 19, as shown in FIG. 1. The cured resin 21 should also have good adhesion to the protective sheath 16. By way of example, resins suitable for use in the overcoat sheath 19 may include Desoto, Inc. No. 32B7-9-29, although it is to be understood that other suitable resins may also be employed.

Obviously, many modifications and variations of the present invention are possible in the light of the above teachings. It is therefore to be understood that within the scope of the appended claims the invention may be practiced otherwise than as specifically described.

What is claimed is:

1. A fiber optic microcable, comprising:
an optical fiber core;
a buffer surrounding said core;
a protective sheath adhering to and surrounding said buffer, said protective sheath including:
an ultraviolet light cured first resin having a post-cure Young's modulus ranging from approximately 700,000 to 2,500,000 kPa, a post-cure tensile strength of approximately 28,000 to 56,000 kPa, a post-cure moisture absorption of less than one per cent after 24 hours of water immersion, an uncured viscosity of less than 250 centipoise within the range of 27° C. to 60° C., and a glass transition temperature ranging from 60° C. to 105° C.; and
a plurality of fibers embedded in said resin; and
an unfilled overcoat sheath formed of an ultraviolet light cured second resin.

2. The microcable of claim 1 wherein:
said first and second resins are cured upon exposure to ultraviolet light having a wavelength anywhere from 290 to 400 nanometers.

3. A fiber optic microcable, comprising:
an optical fiber core;
a buffer surrounding said core;
a protective sheath adhering to and surrounding said buffer, said protective sheath including:
an ultraviolet light cured first resin having a post-cure Young's modulus ranging from approximately 700,000 to 2,500,000 kPa; and
a plurality of fibers embedded in said resin; and
an unfilled overcoat sheath formed of an ultraviolet light cured second resin.

4. The microcable of claim 3 wherein:
said first resin has a post-cure tensile strength of approximately 28,000 to 56,000 kPa.

5. The microcable of claim 4 wherein:
said first resin has a post-cure moisture absorption of less than one per cent after 24 hours of water immersion.

6. The microcable of claim 5 wherein:
said first resin has an uncured viscosity of less than 250 centipoise within the range of 27° C. to 60° C.

7. The microcable of claim 6 wherein:
said first resin has a glass transition temperature ranging from 60° C. to 105° C.

8. The microcable of claim 7 wherein:
said first and second resins are cured upon exposure to ultraviolet light having a wavelength anywhere from 290 to 400 nanometers.

9. A method for fabricating a fiber optic microcable, comprising the steps of:
forming a first resinous coating of an ultraviolet light curable first resin around a buffered optical waveguide, said first resin having a post-cure Young's modulus ranging from approximately 700,000 to 2,500,000 kPa, a post-cure tensile strength of approximately 28,000 to 56,000 kPa, a post-cure moisture absorption of less than one per cent after 24 hours of water immersion, an uncured viscosity of less than 250 centipoise at 27° C., and a glass transition temperature ranging from 60° C. to 105° C.;
curing said first resinous coating by exposing said first resin to ultraviolet light to form a protective sheath;
forming a second resinous coating of an ultraviolet light curable second resin around said protective sheath; and
curing said second resinous coating by exposing said second resin to ultraviolet light to form an unfilled overcoat sheath.

10. The method of claim 9 wherein:
said first resin is cured by exposing said first resin to ultraviolet light having a wavelength ranging from 290 to 400 nanometers at an intensity, I, incident upon said first resin, where $I \leq 100,000$ microwatts/cm$^2$.

* * * * *